(12) United States Patent
Venkataswami et al.

(10) Patent No.: US 7,995,576 B2
(45) Date of Patent: Aug. 9, 2011

(54) METHOD AND SYSTEM FOR REDUCING LATENCY IN A MULTI-CHANNEL MULTICAST STREAMING ENVIRONMENT IN CONTENT-DELIVERY NETWORKS

(75) Inventors: Balaji Venkat Venkataswami, Chennai (IN); Ganesan Velrajan, Chennai (IN); Srinivasan Santhanam, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 452 days.

(21) Appl. No.: 11/496,314

(22) Filed: Jul. 31, 2006

(65) Prior Publication Data
US 2008/0025304 A1 Jan. 31, 2008

(51) Int. Cl.
*H04L 12/56* (2006.01)
(52) U.S. Cl. .......... 370/390; 370/401; 370/389; 725/97; 725/46
(58) Field of Classification Search .......... 725/97, 725/46; 370/390, 403.509
See application file for complete search history.

(56) References Cited

U.S. PATENT DOCUMENTS

| | | | | |
|---|---|---|---|---|
| 6,065,060 A * | 5/2000 | Liu et al. | ........................ | 709/233 |
| 2002/0075815 A1* | 6/2002 | Sharma et al. | ................. | 370/276 |
| 2002/0091771 A1* | 7/2002 | Agraharam et al. | .......... | 709/205 |
| 2003/0189589 A1* | 10/2003 | LeBlanc et al. | ................ | 345/723 |
| 2005/0081244 A1* | 4/2005 | Barrett et al. | .................... | 725/97 |
| 2005/0183120 A1* | 8/2005 | Jain et al. | ......................... | 725/46 |
| 2005/0229072 A1* | 10/2005 | Setton et al. | ................... | 714/748 |
| 2006/0059535 A1* | 3/2006 | D'Avello | ...................... | 725/139 |
| 2006/0171378 A1* | 8/2006 | Harris et al. | .................. | 370/352 |
| 2007/0162568 A1* | 7/2007 | Gupta et al. | ................... | 709/219 |

OTHER PUBLICATIONS

Kieran Mc Donald, Alan F. Smeaton, Seán Marlow, Noel Murphy, Noel E. O'Connor, Online Television Library: Organisation and Content Browsing for General Users, SPIE Electronic Imaging—Storage and Retrieval for Media Databases 2001.San Jose, CA, Jan. 24-26, 2001 found at http://www.computing.dcu.ie/~kmcdon/.

Bill Fenner, Mark Handley, Hugh Holbrook and Isidor Kouvelas; Protocol Independent Multicast—Sparse Mode (PIM-SM):, Oct. 2004 found at http://www3.ietf.org/proceedings/05nov/IDs/draft-ietf-pim-sm-v2-new-11.txt.

Introduction to Cisco IOS® Flexible NetFlow, Cisco Systems, Inc., Copyright 1992-2006, found at http://www.cisco.com/en/US/products/ps6601/prod_white_papers_list.html.

* cited by examiner

*Primary Examiner* — Dang T Ton
*Assistant Examiner* — Pamit Kaur
(74) *Attorney, Agent, or Firm* — Fish & Richardson P.C.

(57) ABSTRACT

Methods, systems and apparatus for reducing apparent latency in content-delivery networks are provided. Sources multicast certain 'preview multicast streams' to multiple subscribers. These preview multicast streams provide pre-recorded content of multicast streams. When a subscriber switches to a desired multicast stream, pre-recorded content of the desired multicast stream is reconstructed from a preview multicast stream. Thereafter, the pre-recorded content is played during the setup of the new multicast distribution tree to minimize latency. Once the distribution tree is setup, live content of the desired multicast stream is made available to the subscriber.

12 Claims, 6 Drawing Sheets

METHOD AND SYSTEM FOR REDUCING LATENCY IN A MULTI-CHANNEL MULTICAST STREAMING ENVIRONMENT IN CONTENT-DELIVERY NETWORKS

CROSS REFERENCE TO RELATED APPLICATION

This application is related to U.S. patent application Ser. No. 11/496,174 entitled "METHOD AND SYSTEM FOR BILLING NETWORK USAGE IN A NETWORK", by Balaji Venkat Venkataswami et al., and filed on the same date as the present application.

BACKGROUND OF THE PRESENT INVENTION

1. Field of the Present Invention

Embodiments of the present invention relate, in general, to networking. More specifically, the embodiments of the present invention relate to a method and a system for reducing latency in a multicast content-delivery network.

2. Description of the Background Art

In a typical content-delivery network, sources transmit streaming content, such as a television channel instance, to selected multiple subscribers that have joined a multicast group. As used herein, subscriber refers to the device or mechanism that presents the streaming content in a human perceptible manner. Each source has to generate only a single data stream and a multicast-enabled router forwards a multicast to a particular network only if there are multicast receivers on that network.

Membership in a multicast group is dynamic; hosts can join and leave at any time. There is no restriction on the location or number of members in a multicast group. A host can be a member of more than one multicast group at a time. How active a multicast group is and what members it has can vary from group to group and from time to time. A multicast group can be active for a long time, or it may be very short-lived. Membership in a group can change constantly. A group that has members may have no activity.

Routers executing a multicast routing protocol, such as Protocol-Independent Multicast (PIM), maintain forwarding tables to forward multicast datagrams. Routers use Internet Group Management Protocol (IGMP) to learn whether members of a group are present on their directly attached subnets. Hosts join multicast groups by sending IGMP report messages.

Many multimedia applications involve multiple participants. IP multicast is naturally suitable for this communication paradigm.

To join a multicast, a subscriber transmits a multicast-group join message to a multicast router operated by a service provider. The join message includes a control packet such as an IGMP join message. Subsequently, the router transmits a control packet such as a PIM join message to a Rendezvous Point (RP) in the content-delivery network. Thereafter, the RP transmits the PIM join message to the source of the multicast stream. In this way, a multicast distribution tree is set up after which the subscriber is able to receive the multicast stream. The process of setting up the multicast distribution tree is known as 'control packet processing'.

Setting up the multicast distribution tree requires processing the control packet, a process that can involve a considerable amount of time. Thus, there is often substantial latency for the subscriber to receive the transmission of the multicast primarily because of the need to process the control packets.

When the subscriber switches from one multicast stream to another, a new multicast distribution tree must be set up. For each multicast stream, state must be maintained and routers sitting in the path from the source of the multicast stream to the subscriber must process the control packets.

If the subscriber switches between a number of multicast streams within a time window, then the control packet processing would also have to scale to match the number of multicast streams subscribed to by the subscriber within the time window. This leads to a substantial amount of additional processing by the routers in the multicast distribution tree. Additional bandwidth may need to be allocated if the selected multicast stream is not already in the set of multicast streams.

Processing the control packets, specifically, the IGMP reports and PIM joins, takes a substantial amount of time, thus resulting in a noticeable delay when switching from one channel instance to another. It is clearly undesirable to subject a viewer to many seconds of delay when switching from one channel instance to another. What is needed is a method and a system for lessening the delay when switching from one multicast channel to another before the contents of the channels are displayed for the viewer.

DETAILED DESCRIPTION OF EMBODIMENTS OF THE INVENTION

Embodiments of the present invention provide a method, a system, and machine-readable media for reducing latency in a network. In the description herein for embodiments of the present invention, numerous specific details are provided, such as examples of components and/or methods, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In a typical multicast network, various multicast streams are transmitted to various subscribers. There can be a plurality of sources that transmit the multicast streams to subscribers. For each source in the multicast network, a multicast distribution tree is maintained. The multicast distribution tree is based on join messages received from subscribers interested in receiving the multicast stream. The multicast distribution tree is a distributed system that includes the source of the multicast stream, subscribers of the multicast stream, and the routers between the source and the subscribers. The subscribers in the multicast distribution tree are collectively termed as the multicast group. The source uses the multicast distribution tree to multicast the multicast stream to all the subscribers in the multicast group.

When a subscriber switches from one multicast stream to another, the multicast distribution trees of these multicast streams are modified. This leads to extra processing on routers in the multicast distribution trees. A substantial delay in the set up of the multicast distribution trees occurs, resulting in latency in the transmission of the desired multicast stream to the subscriber.

Embodiments of the present invention provide a method that reduces latency in a multicast network. Specifically, sources multicast certain 'preview multicast streams' to their subscribers while the multicast tree is being set up. A preview multicast stream multicast by a source provides pre-recorded content of multicast streams provided by that source or a group of sources. When a subscriber switches to a desired multicast stream, the pre-recorded content of the desired multicast stream is played during the setup of the new multicast distribution tree to minimize latency. Once the distribution tree is setup, live content of the desired multicast stream is made available to the subscriber.

Figure 1:
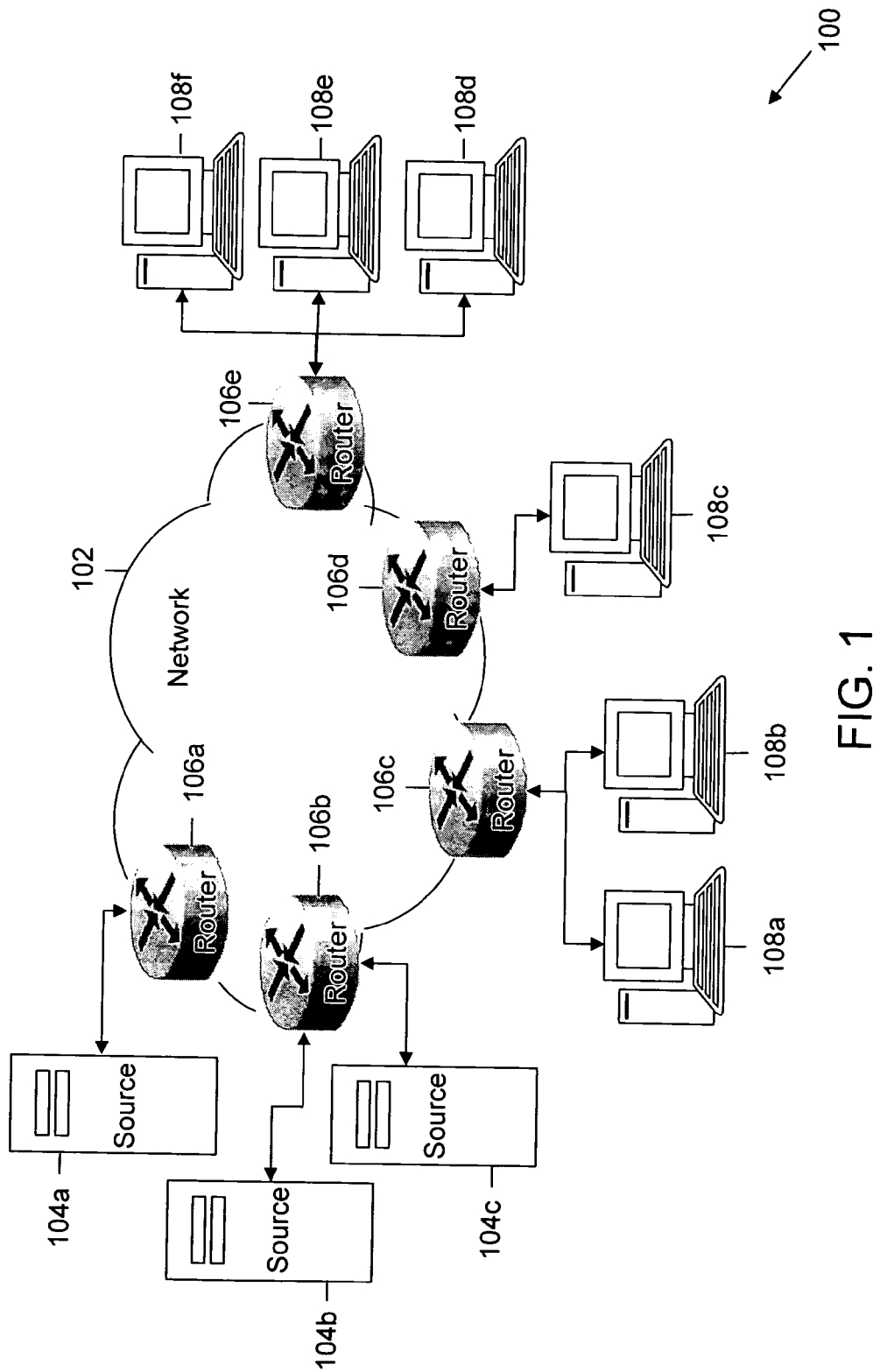
FIG. 1 illustrates a typical network environment for implementing embodiments of the present invention.

Referring now to the drawings, particularly by their reference numbers, FIG. 1 illustrates a network environment 100 for implementing embodiments of the present invention. Network environment 100 includes a network 102, a plurality of sources designated as sources 104, a plurality of routers designated as routers 106, and a plurality of subscribers designated as subscribers 108. Each subscriber comprises means for displaying the streaming content in a human perceptible manner. Network 102 can be a collection of individual networks, interconnected with each other and functioning as a single large network. Examples of network 102 include, but are not limited to, Local Area Networks (LANs), Wide Area Networks (WANs), Metropolitan Area Networks (MANs), and the Internet. Further, network 102 may be a wireless or wired network. Network 102 provides a communication medium to sources 104 and subscribers 108 for transmitting content from one or more sources to one or more subscribers. Further, sources 104 can be any part or region of network 102, such as network devices, processes, network links or resources, controlled or owned domains, Universal Resource Locators (URLs), content-delivery sites, and so forth. Examples of sources 104 and subscribers 108 include, but are not limited to, computers, servers, and network management stations.

A subscriber interested in receiving content provided by a particular multicast stream transmits a request to a router that is associated with the subscriber. Subsequently, the router transmits the request to the source of the multicast stream. The request is transmitted through various routers included in the path of the multicast distribution tree of the multicast stream. Once the request is received by the source, the subscriber is included in the multicast group of the multicast stream. Consequently, the multicast stream is multicast to the subscriber through a path in the multicast distribution tree.

Further, sources 104 can provide their multicast streams to various edge sites included in network 102. These edge sites store the content provided by sources 104 and provide it when requested. For example, a subscriber makes a request for certain content to a router associated with it. Thereafter, the router transmits the request to an edge site located in its vicinity. The edge site can be an Internet Service Provider (ISP), a web host, and a cable company, among others. Subsequently, the edge site provides the requested content to the router. Finally, the router transmits the requested content to the subscriber.

One skilled in the art will appreciate that FIG. 1 is merely a representation of a simplified network for the purpose of illustrating the present embodiment and the present invention is not to be limited by the number of illustrated sources 104, routers 106 and subscribers 108. It is to be understood that the specific designation of sources 104, routers 106 and subscribers 108 is for the convenience of the reader and is not to be construed as limiting network environment 100 to a specific number of sources 104, routers 106 and subscribers 108 or to specific types of sources 104, routers 106 and subscribers 108 present in network environment 100.

In accordance with an embodiment of the present invention, network 102 is a multicast network, where sources 104 transmit multicast streams to subscribers 108. Subscribers 108 can have access to different kinds of content provided by sources 104. Therefore, subscribers 108 subscribe to sources 104 for receiving content they are interested in. For example, subscribers 108a, 108b, and 108c subscribe to a multicast stream provided by source 104a. Subsequently, source 104a transmits the multicast stream to router 106a, which then transmits the multicast stream to routers 106c and 106d through network 102. Thereafter, router 106c creates a copy of the multicast stream and transmits the multicast stream to subscribers 108a and 108b. Router 106d transmits the multicast stream to subscriber 108c. Examples of content in a multicast stream include, but are not limited to, data files, audio and video.

When a subscriber from subscribers 108 switches between various multicast streams provided by sources 104, the multicast distribution trees of the multicast streams are modified. This involves a substantial delay in the set up of the multicast distribution trees, thereby resulting in latency in the transmission of the desired multicast stream to the subscriber.

Figure 2:
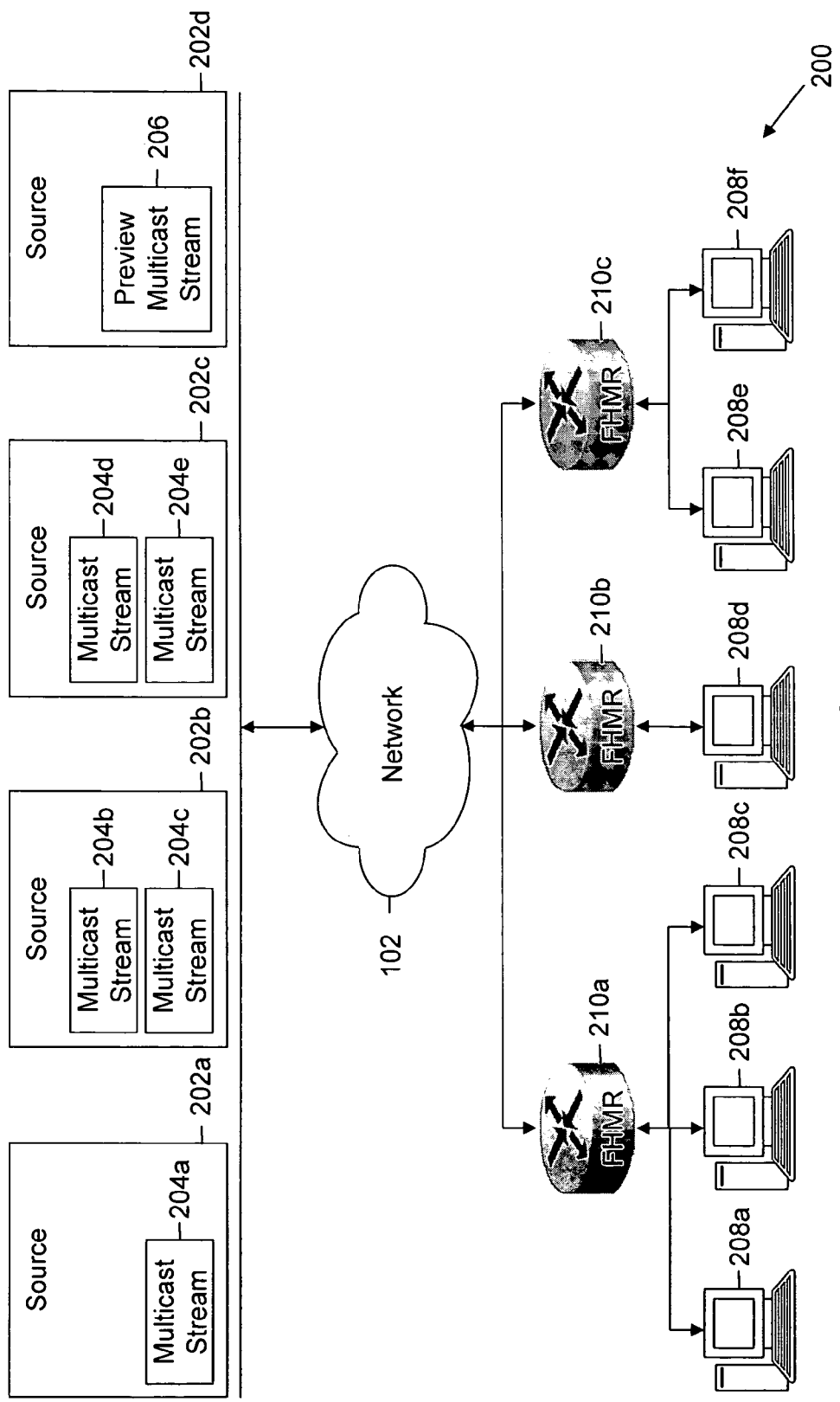
FIG. 2 illustrates various elements of a system for reducing latency in a network, in accordance with an embodiment of the present invention.

FIG. 2 illustrates various elements of a system 200 for reducing latency in network 102, in accordance with an embodiment of the present invention. System 200 includes a plurality of sources designated as sources 202, a plurality of multicast streams (provided by sources 202) designated as multicast streams 204, a plurality of subscribers designated as subscribers 208, and network 102. Sources 202 transmit multicast streams 204 to subscribers 208 across network 102. Sources 202 can transmit one or more multicast streams.

Further, system 200 includes a plurality of 'First Hop Multicast Routers' (FHMRs) (associated with subscribers 208) designated as FHMRs 210. An FHMR is a network infrastructure device in network 102 that is one hop away from a subscriber. Therefore, the subscriber communicates with other network infrastructure devices in network 102 through the FHMR. Examples of network infrastructure devices include, but are not limited to, routers, switches, hubs, gateways, repeaters and bridges. The FHMR receives a multicast stream that the subscriber has subscribed to and then transmits it to the subscriber.

Further, it should be noted that an FHMR from FHMRs 210 is not limited to an association with only a specific number of subscribers. For example, a single FHMR can be associated with a plurality of subscribers present in a LAN.

In accordance with an embodiment of the present invention, network 102 is a multicast network running Protocol-Independent Multicast-Sparse Mode (PIM-SM). As mentioned before, subscribers 208 can subscribe to multicast streams 204 provided by sources 202. For example, subscriber 208a can subscribe to any multicast stream from multicast streams 204. For subscription to a particular multicast stream, subscriber 208a transmits an Internet Group Management Protocol (IGMP) join message to FHMR 210a. Similarly, subscribers 208b, 208c, 208d, 208e and 208f can subscribe to any multicast stream from multicast streams 204. Once FHMR 210a receives the IGMP join message, it transmits a Protocol-Independent Multicast (PIM) join message to a Rendezvous Point (RP) in network 102. The RP is a router in network 102, where PIM join messages from FHMRs 210 for joining sources 202 are received. In an embodiment of the present invention, there are different RPs for different multicast groups in network 102. Further, the RP transmits the PIM join messages to sources 202. The PIM join messages can also be transmitted by FHMRs 210 to sources 202, through certain shortest paths that do not include the RP. Based on the PIM join messages received, multicast distribution trees are formed. A multicast distribution tree of a multicast stream provided by a source includes paths from the source to the subscribers, and is used to multicast the multicast stream. A multicast distribution tree can be a shared distribution tree or a source-based distribution tree.

After a multicast distribution tree for a multicast stream is formed, the source of the multicast stream transmits an instance of the multicast stream to the RP. Thereafter, the instance of the multicast stream is transmitted to the subscribers of the multicast stream such that a copy of the instance is created each time that the branches of the multicast distribution tree split.

When a subscriber switches from one multicast stream to another, there is a change in the setup of the multicast distribution trees of these multicast streams. This process involves a considerable amount of time, resulting in latency in the transmission of the desired multicast stream to the subscriber. In an embodiment of the present invention, sources 202 generate one or more preview multicast steams from multicast streams 204. The preview multicast streams provide the content of multicast streams 204 that was recorded during a predefined recording-time period. The content recorded during the predefined recording-time period is hereinafter referred as 'pre-recorded content'. The preview multicast streams have multicast addresses of their own.

In an embodiment of the present invention, sources 202 generate the preview multicast streams in a predefined frame format. In accordance with an embodiment of the present invention, the predefined frame format is defined by a system administrator of sources 202 that are generating the preview multicast streams. In accordance with an embodiment of the present invention, the system administrator defines the predefined frame format as interleaved frames of multicast streams 204. This is hereinafter referred as 'interleaved frame format'. Details regarding the interleaved frame format have been provided with reference to FIG. 3.

In system 200, source 202d generates a preview multicast stream 206, which provides the pre-recorded content of multicast streams 204a, 204b, 204c, 204d, and 204e. Further, the pre-recorded content is multicast repeatedly for a predefined preview-time period. The predefined recording-time period and the predefined preview-time period can be configured as the same. For example, for preview multicast stream 206, the predefined recording-time period and the predefined preview-time period are configured as 20 minutes. Therefore, preview multicast stream 206 provides content of multicast streams 204a, 204b, 204c, 204d, and 204e that was recorded during the last 20 minutes. Preview multicast stream 206 provides five minutes of the pre-recorded content such that it provides one minute content each for multicast streams 204a, 204b, 204c, 204d, and 204e. Therefore, the five minutes of the pre-recorded content is multicast four times in the 20 minutes of the predefined preview-time period.

When a subscriber subscribes to a multicast stream, the subscriber is automatically subscribed to a preview multicast stream that includes the multicast stream. Continuing from the above example, subscriber 208a subscribes to multicast stream 204a. Consequently, subscriber 208a is automatically subscribed to preview multicast stream 206. Subsequently, both multicast stream 204a and preview multicast stream 206 are multicast to subscriber 208a.

In accordance with an embodiment of the present invention, the multicast addresses of the preview multicast streams provided by sources 202 can be pre-configured on subscribers 208. For example, a preview multicast stream can be selected by a subscriber by clicking a link on a website. Consequently, the multicast address of the preview multicast stream is pre-configured on the subscriber, which implies that the subscriber is subscribed to receive the preview multicast stream. Subsequently, the preview multicast stream is multicast to the subscriber.

When the subscriber switches to another multicast stream included in the preview multicast stream, the pre-recorded content of the switched multicast stream is reconstructed from the preview multicast stream. Subsequently, the reconstructed content is played with a message indicating that the played content is a pre-recorded content. Continuing from the previous example, subscriber 208a switches to multicast stream 204b. Consequently, one minute of pre-recorded content of multicast stream 204b is reconstructed from preview multicast stream 206. Subsequently, the one minute of the reconstructed content is played with a message that the played content is the pre-recorded content of multicast stream 204b recorded during the last 20 minutes.

Meanwhile, the setup of the multicast distribution trees of multicast streams 204a and 204b are changed. Subsequently, the live content of multicast stream 204b is made available to the subscriber, and is played, instead of the pre-recorded content.

In an embodiment of the present invention, a preview multicast stream is generated by a source providing certain multicast streams. This preview multicast stream provides the pre-recorded content of the multicast streams provided by the source. For example, if a source provides four multicast streams, the source generates a preview multicast stream containing the pre-recorded content of the four multicast streams.

In accordance with another embodiment of the present invention, a single source can be configured to generate preview multicast streams of various multicast streams multicast by a set of sources in the same domain. A domain is defined as an area that is under a single point of control. For example, a plurality of network devices within a LAN can be considered as a domain. It should be noted that preview multicast streams can also be generated across various domains. A single source can be configured to generate preview multicast streams of multicast streams multicast by sources from different domains.

Consider, for example, sources 202a, 202b, 202c and 202d are included in the same domain. Consequently, source 202d generates preview multicast stream 206 that provides the pre-recorded content of multicast stream 204a provided by source 202a, multicast streams 204b and 204c provided by source 202b, and multicast streams 204d and 204e provided by source 202c. However, it should be noted that a source can generate a preview multicast stream providing pre-recorded content of a selected set of multicast streams. Continuing from the above example, source 202d can generate another preview multicast stream providing the pre-recorded content of multicast streams 204a, 204b and 204c.

Figure 3:
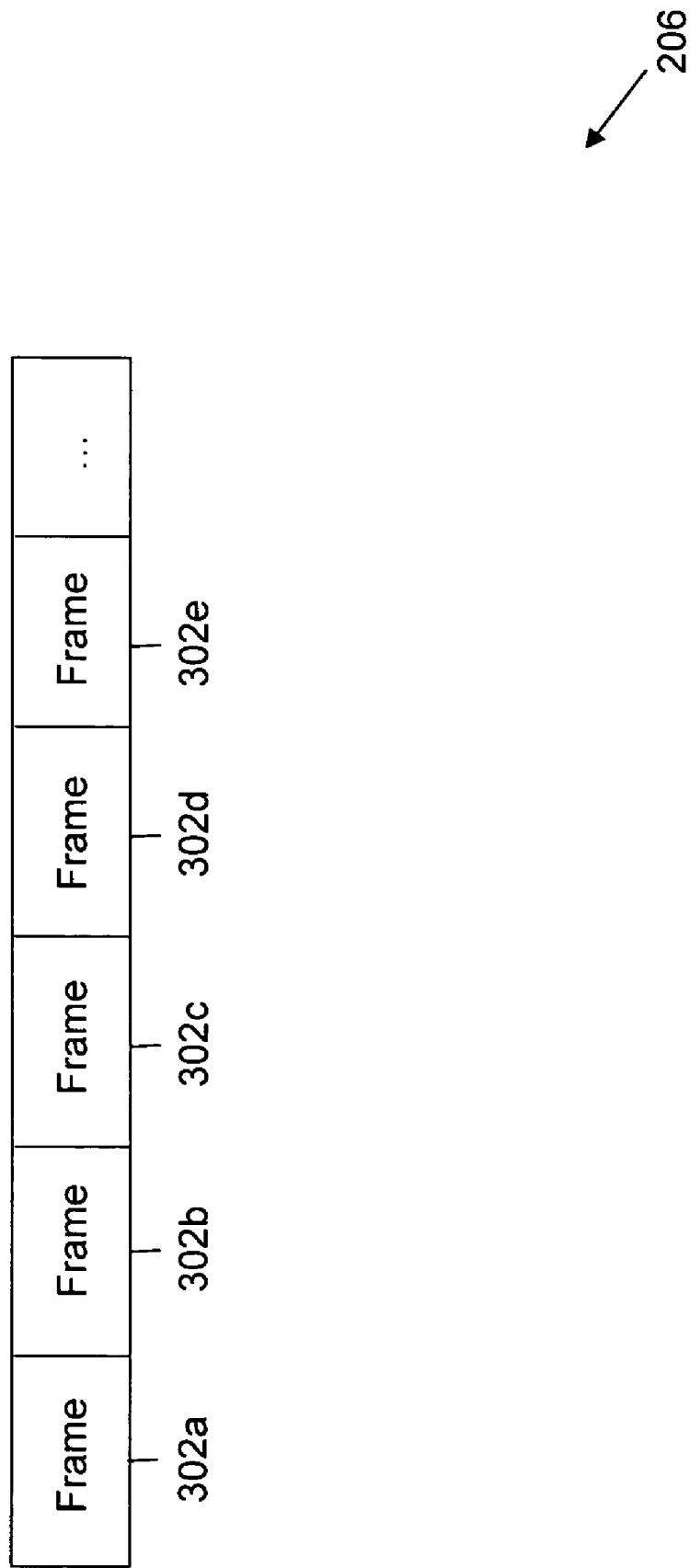
FIG. 3 illustrates an interleaved frame format of a 'preview multicast stream', in accordance with an embodiment of the present invention.

As mentioned before, a preview multicast stream is generated by a source in the interleaved frame format. FIG. 3 illustrates the interleaved frame format of preview multicast stream 206, in accordance with an embodiment of the present invention. Preview multicast stream 206 includes various frames of multicast streams 204a, 204b, 204c, 204d, and 204e in an interleaved manner. The frames include content in the form of packets.

With reference to FIG. 3, frames 302a, 302b, 302c, 302d and 302e correspond to frames of multicast streams 204a, 204b, 204c, 204d, and 204e, respectively. Therefore, a frame of multicast stream 204b follows a frame of multicast stream 204a, which follows a frame of multicast stream 204e, and so forth. In this way, frames of multicast streams 204a, 204b, 204c, 204d, and 204e are interleaved. The frames can be, for example, of two seconds size each. Therefore, a subscriber does not have to wait for playing pre-recorded content of a desired multicast stream. Continuing from the previous example, if preview multicast stream 206 was not generated in the interleaved frame format, subscriber 208a would have had to wait till the pre-recorded content of multicast stream 204b is multicast on preview multicast stream 206. Further, the frame size can be defined by a system administrator of the source that is generating the preview multicast stream.

Further, appropriate control information is provided in preview multicast stream 206, to delineate the starting and the ending points of packets corresponding to multicast streams 204a, 204b, 204c, 204d, and 204e. This helps in the reconstruction of pre-recorded content of a desired multicast stream from preview multicast stream 206. For example, the reconstruction of the pre-recorded content of multicast stream 204b can be performed by checking header information of its frames.

As mentioned before, the pre-recorded content of multicast streams 204a, 204b, 204c, 204d, and 204e is multicast repeatedly. This implies that the frames of multicast streams 204a, 204b, 204c, 204d and 204e are multicast repeatedly in an interleaved manner. Since the same pre-recorded content is multicast repeatedly, it is desired that the pre-recorded content be cached at a cache associated with the subscriber.

Figure 4:
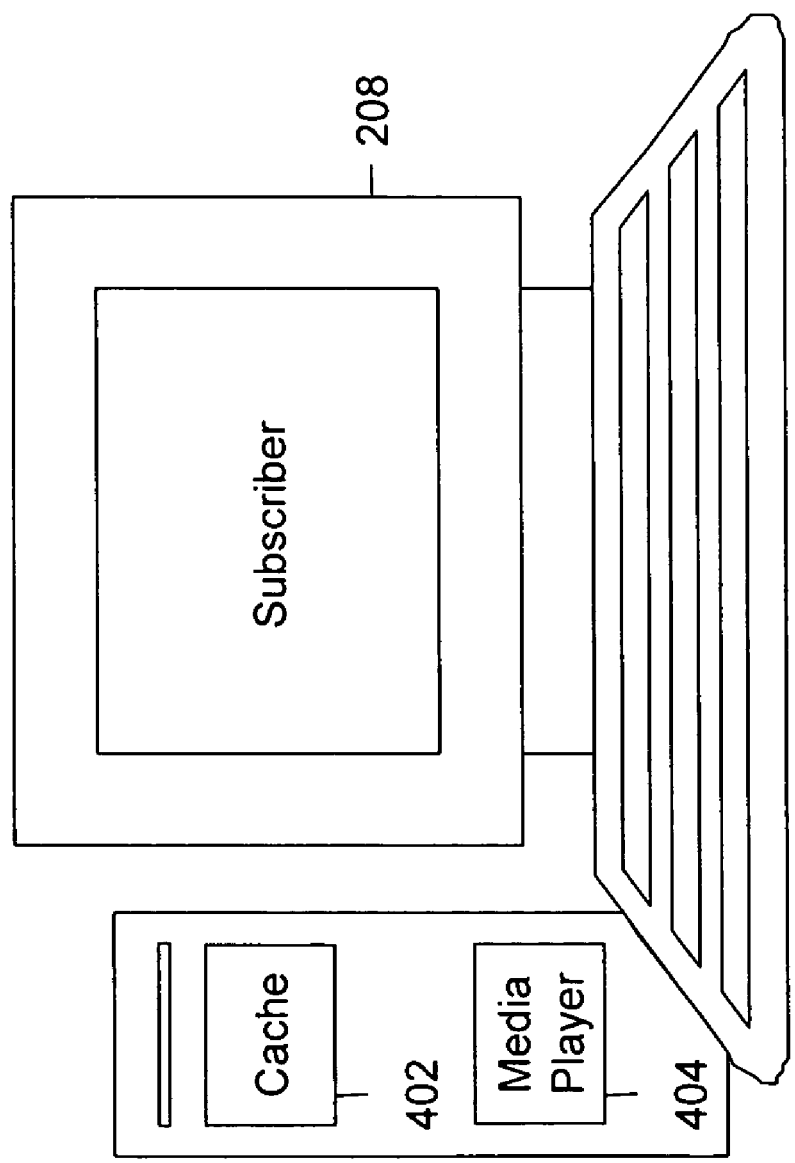
FIG. 4 illustrates various elements of a subscriber, in accordance with an embodiment of the present invention.

FIG. 4 illustrates various elements of subscribers 208, in accordance with an embodiment of the present invention. A subscriber from subscribers 208 includes a cache 402 for caching pre-recorded content provided by preview multicast streams subscribed to by the subscriber.

Continuing from the previous example, preview multicast stream 206 provides the content of multicast streams 204a, 204b, 204c, 204d, and 204e that was recorded during the last 20 minutes. Preview multicast stream 206 provides five minutes of the pre-recorded content, which is multicast four times in the 20 minutes of the predefined preview-time period. If the subscriber caches the five minutes of the pre-recorded content, a repeat multicast of the pre-recorded content would not be required. Further, the cache can be refreshed with new pre-recorded content in every 20 minutes of the predefined recording-time period.

Further, the subscriber includes a media player 404. When the subscriber switches to a multicast stream included in a received preview multicast stream, media player 404 switches to the received preview multicast stream and reconstructs the pre-recorded content of the multicast stream. Subsequently, media player 404 plays the reconstructed content with an appropriate message. Thereafter, when the live content of the multicast stream is received, media player 404 switches over to the live content from the pre-recorded content. Media player 404 can be an application such as Windows™ media player and stream player. In an alternative embodiment, subscribers 208 may be an IP enabled entertainment device capable receiving multicast streams, caching the stream and then presenting the stream on a screen for viewing by one or more viewers.

Figure 5:
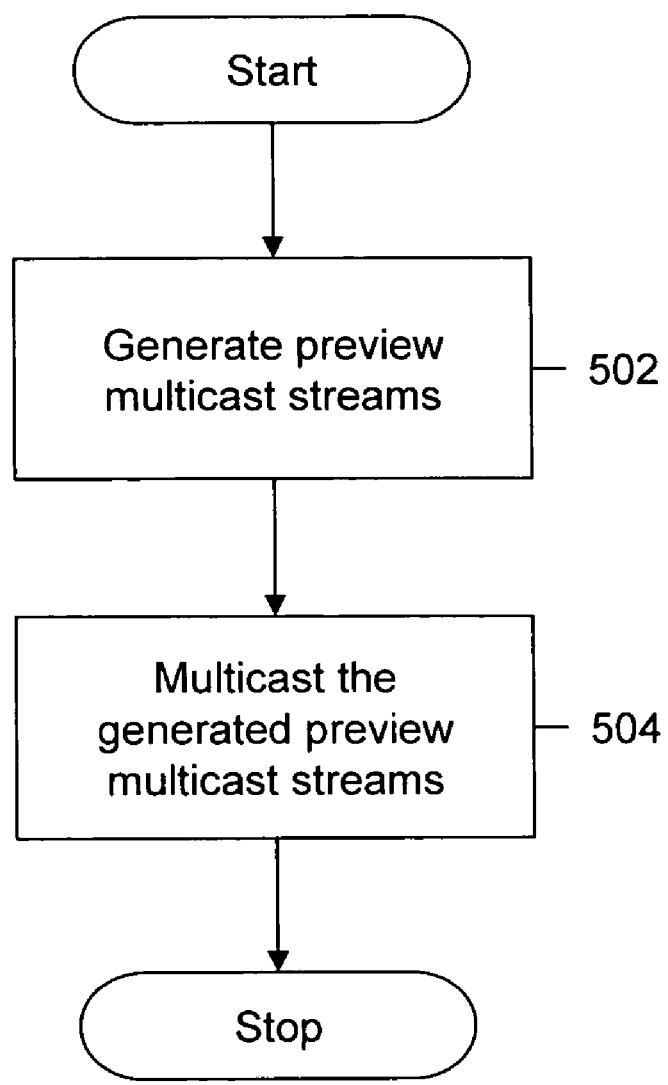
FIG. 5 illustrates a flow diagram of a method for reducing latency in the network, in accordance with an embodiment of the present invention.

FIG. 5 illustrates a flow diagram of a method for reducing latency in network 102, in accordance with an embodiment of the present invention. At 502, preview multicast streams are generated from various multicast streams. As mentioned before, the preview multicast streams can be individually generated by the sources of the multicast streams. In addition, a single source can also generate the preview multicast streams from the multicast streams provided by other sources in the same domain.

Further, the preview multicast streams provide the content of the multicast streams that was recorded during the predefined recording-time period. Therefore, every time that the predefined recording-time period is completed, the previous pre-recorded content is replaced by the new pre-recorded content. For a preview multicast stream, the predefined recording-time period can be defined by a system administrator of the source that is generating the preview multicast stream. As mentioned before, the preview multicast streams are generated by the sources in the interleaved frame format. Details of the interleaved frame format have been provided in conjunction with FIG. 3.

After the generation of the preview multicast streams, at 504, the preview multicast streams are multicast to various subscribers that have subscribed to these preview multicast streams. As mentioned before, pre-recorded content in a preview multicast is multicast repeatedly for the predefined preview-time period. The predefined preview-time period can be defined by a system administrator of the source that is generating the preview multicast stream.

A subscriber can choose to subscribe to a set of preview multicast streams, based on a set of multicast streams the subscriber is interested in. After the subscription to the set of preview multicast streams, the subscriber receives each of the preview multicast streams included in the subscribed set of preview multicast streams. Thereafter, the subscriber can switch between various multicast streams provided by these preview multicast streams, without experiencing any latency in the transmission of the multicast streams. This has been explained in detail in conjunction with FIG. 6.

Figure 6:
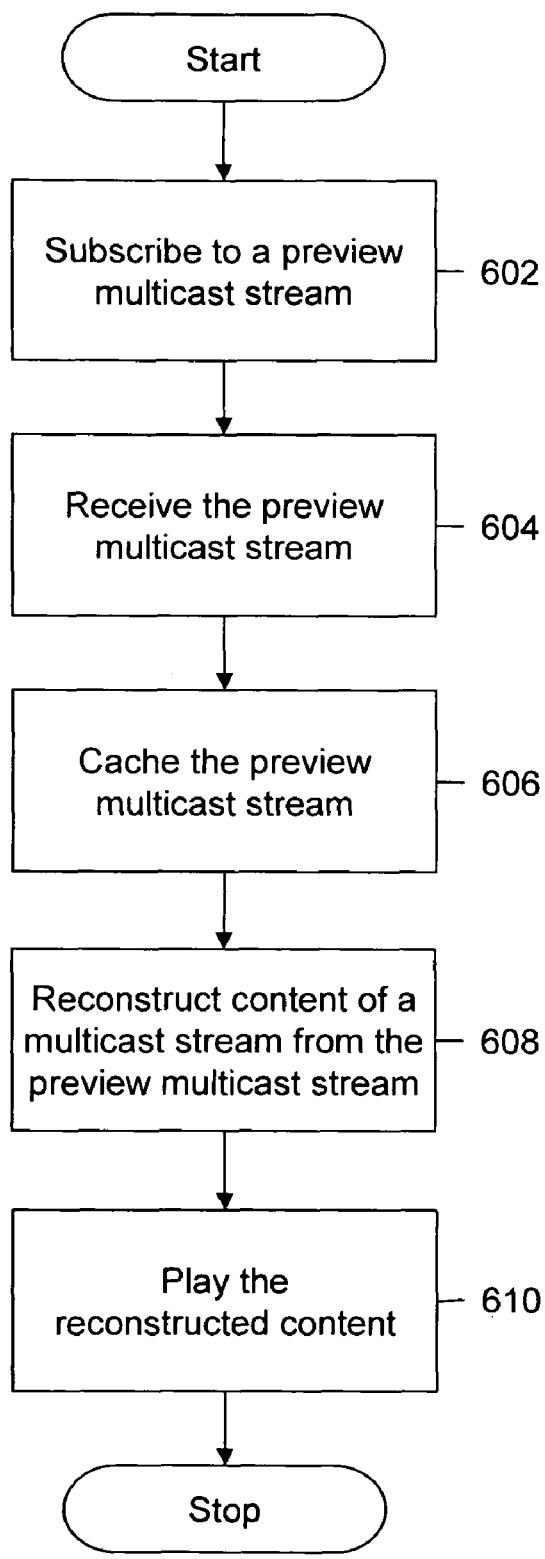
FIG. 6 illustrates a flow diagram of a method for reducing latency in the network, in accordance with an embodiment of the present invention.

FIG. 6 illustrates a flow diagram of a method for reducing latency in network 102, in accordance with an embodiment of the present invention. At 602, a subscriber subscribes to a preview multicast stream. As mentioned before, the subscriber is automatically subscribed to the preview multicast stream when the subscriber subscribes to a multicast stream included in the preview multicast stream. The subscriber can also pre-configure the preview multicast stream and subscribe to it. After subscribing to the preview multicast stream, at 604, the subscriber receives the subscribed preview multicast stream.

Thereafter, at 606, the subscriber caches the received preview multicast stream. As mentioned before, the pre-recorded content provided by the received preview multicast is cached at cache 402 such that none of the frames are repeated.

When the subscriber switches to a multicast stream included in the preview multicast stream, media player 404 switches to the preview multicast stream. Subsequently, at 608, media player 404 reconstructs the pre-recorded content of the switched multicast stream from the preview multicast stream. Thereafter, at 610, media player 404 plays the reconstructed content.

While 608 and 610 are performed, the multicast distribution tree of the switched multicast tree is set up. Subsequently, the live content of the switched multicast stream is made available to the subscriber. Once the live content is received, media player 404 starts playing the live content. Therefore, there is no undue delay when the subscriber switches between various multicast streams.

In accordance with an embodiment of the present invention, a system for reducing latency in a multicast network is provided. The system includes various sources, which are adapted for providing various multicast streams. These sources include means for generating one or more preview multicast streams from the multicast streams; and means for multicasting the generated preview multicast streams. Further, the system includes various subscribers that further include means for subscribing to the generated preview multicast streams; means for receiving the subscribed preview multicast streams; a cache for caching the received preview multicast streams; and a media player for: reconstructing pre-recorded content of a required multicast stream from a received preview multicast stream, which includes the required multicast stream, and playing the reconstructed content.

In accordance with an embodiment of the present invention, a method for reducing latency in a multicast network is provided. The method comprises generating one or more preview multicast streams from a plurality of multicast streams, each preview multicast stream providing pre-recorded content of two or more multicast streams in a pre-defined frame format; and multicasting the generated preview multicast streams to one or more subscribers.

In accordance with an embodiment of the present invention, a method for reducing latency in a multicast network is provided. The method comprises subscribing to a preview multicast steam; receiving the preview multicast stream from a source, the preview multicast stream providing pre-recorded content of two or more multicast streams in a pre-defined frame format; reconstructing pre-recorded content of a multicast stream selected by a subscriber, from the received preview multicast stream; and playing the reconstructed content. The method further comprises caching the preview multicast stream.

According to an embodiment of the present invention, the latency in the transmission of a switched multicast stream to a subscriber is reduced. A preview multicast stream providing one or more multicast streams along with the switched multicast stream is multicast to the subscriber. When the subscriber switches to a multicast stream included in the preview multicast stream, the pre-recorded content of the switched multicast stream is reconstructed from the preview multicast stream. Thereafter, the reconstructed content is played. Meanwhile, the multicast distribution tree of the switched multicast stream is set up and the live content is made available to the subscriber.

Embodiments of the present invention facilitate the reconstruction of the pre-recorded content of the switched multicast stream without any delay. As the pre-recorded content of the multicast streams in the preview multicast stream is provided in the interleaved frame format, media player 404 does not have to wait for playing the pre-recorded content of the switched multicast stream.

Embodiments of the present invention facilitate an updated preview of a switched multicast stream to a subscriber. For example, preview multicast stream 206 provides the content that was recorded in the last 20 minutes. In an embodiment of the present invention, pre-recorded content of various multicast streams in a preview multicast stream is updated from time-to-time.

According to an embodiment of the present invention, there is no need to multicast the same pre-recorded content repeatedly in the predefined preview-time period. The subscriber caches the pre-recorded content provided by the preview multicast stream. Subsequently, media player 404 reconstructs the pre-recorded content of the switched multicast stream from the cached pre-recorded content.

Although the present invention has been discussed with respect to specific embodiments thereof, these embodiments are merely illustrative, and not restrictive, of the present invention. For example, a 'method for reducing latency in a multicast network' can include any type of analysis, manual or automatic, to anticipate the needs of obviating redundant actions.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Any suitable programming language can be used to implement the routines of an embodiment of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments of the present invention, multiple steps shown as sequential in this specification can be performed at the same time. The sequence of operations described herein can be interrupted, suspended, or otherwise controlled by another process. The routines can operate in a networking environment or as stand-alone routines occupying all, or a substantial part, of the system processing.

In the description herein for the embodiments of the present invention, numerous specific details are provided, such as examples of elements and/or methods, to provide a thorough understanding of the embodiments of the present invention. One skilled in the relevant art will recognize, however, that an embodiment of the present invention can be practiced without one or more of the specific details, or with other apparatus, systems, assemblies, methods, components, parts, and/or the like. In other instances, well-known operations are not specifically shown or described in detail to avoid obscuring aspects of the embodiments of the present invention.

A 'computer program' for purposes of the embodiments of the present invention may include any processor-containing device, such as a mainframe computer, personal computer, laptop, notebook, microcomputer, server, personal data manager (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a pre-determined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of the embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of an embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the present invention to the precise forms disclosed herein. While specific embodiments of, and examples for, the present invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of the embodiments of the present invention will be employed without a corresponding use of other features without departing from the scope and spirit of the present invention as set forth. Therefore, many modifications may be made to adapt a particular situation or material to the essential scope and spirit of the present invention. It is intended that the present invention not be limited to the particular terms used in following claims and/or to the particular embodiment disclosed as the best mode contemplated for carrying out this present invention, but that the present invention will include any and all embodiments and equivalents falling within the scope of the appended claims.

What is claimed is:

1. In a network, a method comprising:
    transmitting, by a first source, a first multicast stream to a first group of receivers and transmitting, by a second source, a second multicast stream to a second group of receivers;
    generating, using the first source, a preview multicast stream from the first multicast stream and the second multicast stream, wherein the preview multicast stream includes interleaved frames from the first multicast stream and the second multicast stream, the interleaved frames from the first multicast stream providing pre-recorded content from the first multicast stream and the interleaved frames from the second multicast stream providing pre-recorded content from the second multicast stream, the preview multicast stream being in a predefined frame format, and wherein the pre-recorded content comprises content that was recorded during a predefined recording-time period; and
    transmitting, by the first source, the preview multicast stream to a third group of receivers at a same time the first source is transmitting the first multicast stream to the first group of receivers.

2. The method of claim 1, wherein at least a portion of the pre-recorded content is played with a message that the portion of the pre-recorded content is pre-recorded.

3. The method of claim 1, wherein the pre-recorded content is multicast repeatedly for a selected preview-time period.

4. The method of claim 1, wherein a multicast network runs protocol-independent multicast-sparse mode (PIM-SM) protocol.

5. A method in a network comprising:
    generating a preview multicast stream from a first multicast stream and a second multicast stream, wherein the preview multicast stream includes interleaved frames of pre-recorded content from the first multicast stream and the second multicast stream, wherein the pre-recorded content is in a predefined frame format, wherein the pre-recorded content comprises content that was recorded during a predefined recording-time period;
    multicasting the preview multicast stream to one or more receivers;
    receiving, at one of the receivers, the preview multicast stream;
    receiving a request at the receiver to switch from the first multicast stream to the second multicast stream;
    reconstructing, at the receiver, the pre-recorded content of the second multicast stream in response to the request received by the receiver to switch from the first multicast stream to the second multicast stream;
    playing the pre-recorded content of the second multicast stream;

while playing the pre-recorded content, setting up a multicast tree to make live content of the second multicast stream available at the receiver; and upon completion of setting up the multicast tree, switching from playing, at the receiver, the pre-recorded content of the second multicast stream to playing the live content of the second multicast stream.

6. The method of claim 5 further comprising caching the preview multicast stream at the receiver receiving the preview multicast stream.

7. The method of claim 5, wherein the preview multicast stream is received automatically by the receiver when the receiver is receiving at least one of the first multicast stream or the second multicast stream.

8. The method of claim 5 further comprising pre-configuring the preview multicast stream.

9. A system comprising:
   means for generating a preview multicast stream from a first multicast stream and a second multicast stream, wherein the preview multicast stream includes interleaved frames of pre-recorded content from the first multicast stream and the second multicast stream, wherein the pre-recorded content is in a predefined frame format, wherein the pre-recorded content comprises content that was recorded during a predefined recording-time period;
   a multicasting component configured for multicasting the generated preview multicast stream to one or more receivers;
   a receiver configured for receiving the preview multicast stream, wherein the receiver is further configured to assist in reconstructing the pre-recorded content of the second multicast stream in response to a request by the receiver to switch from the first multicast stream to the second multicast stream;
   a display for playing the pre-recorded content of the second multicast stream;
   a processor for setting up a multicast tree while playing the pre-recorded content to make live content of the second multicast stream available at the receiver; and
   a switch configured for switching, upon completion of setting up the multicast tree, from playing, at the receiver, the pre-recorded content of the second multicast stream to playing the live content of the second multicast stream.

10. The system of claim 9, wherein the pre-recorded content is configured to be multicast at least during a predefined preview-time period.

11. The method of claim 5, further comprising replacing previous pre-recorded content with new pre-recorded content when the predefined recording-time period is completed.

12. The system of claim 9, further comprising means for replacing previous pre-recorded content with new pre-recorded content when the predefined recording-time period is completed.

\* \* \* \* \*